Sept. 29, 1931.  G. E. HALLENBECK  1,825,060
REVOLVING HOLDER MACHINE TOOL
Filed May 24, 1926  3 Sheets-Sheet 3
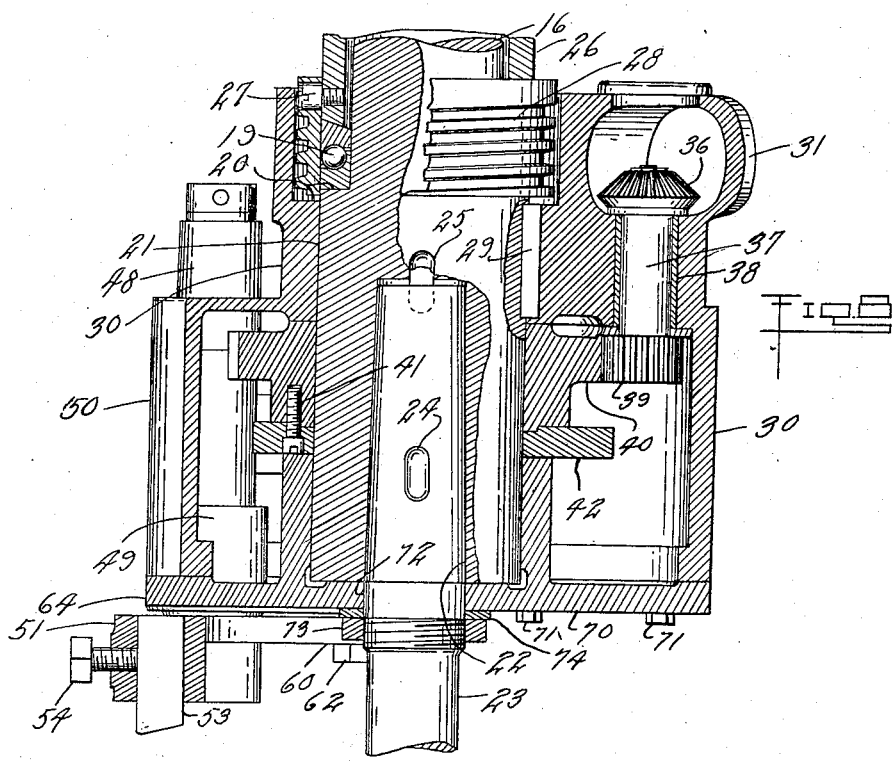
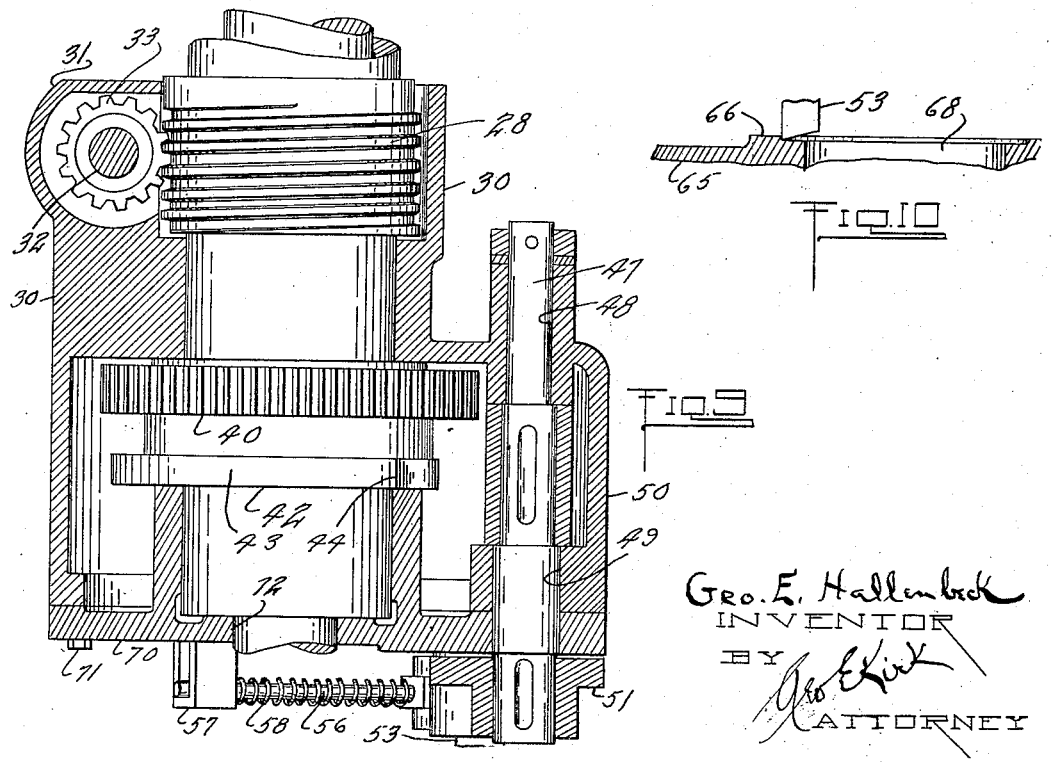

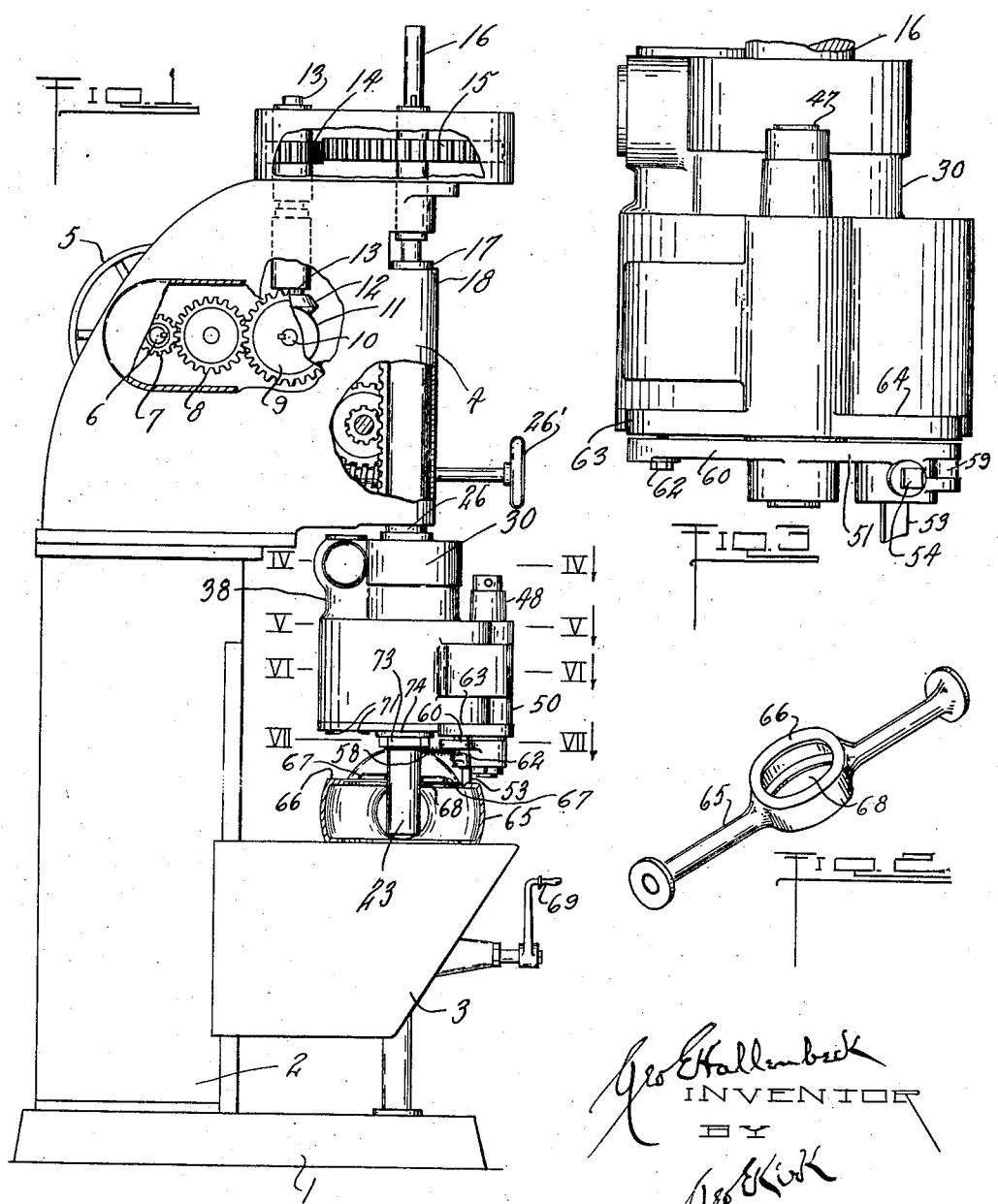

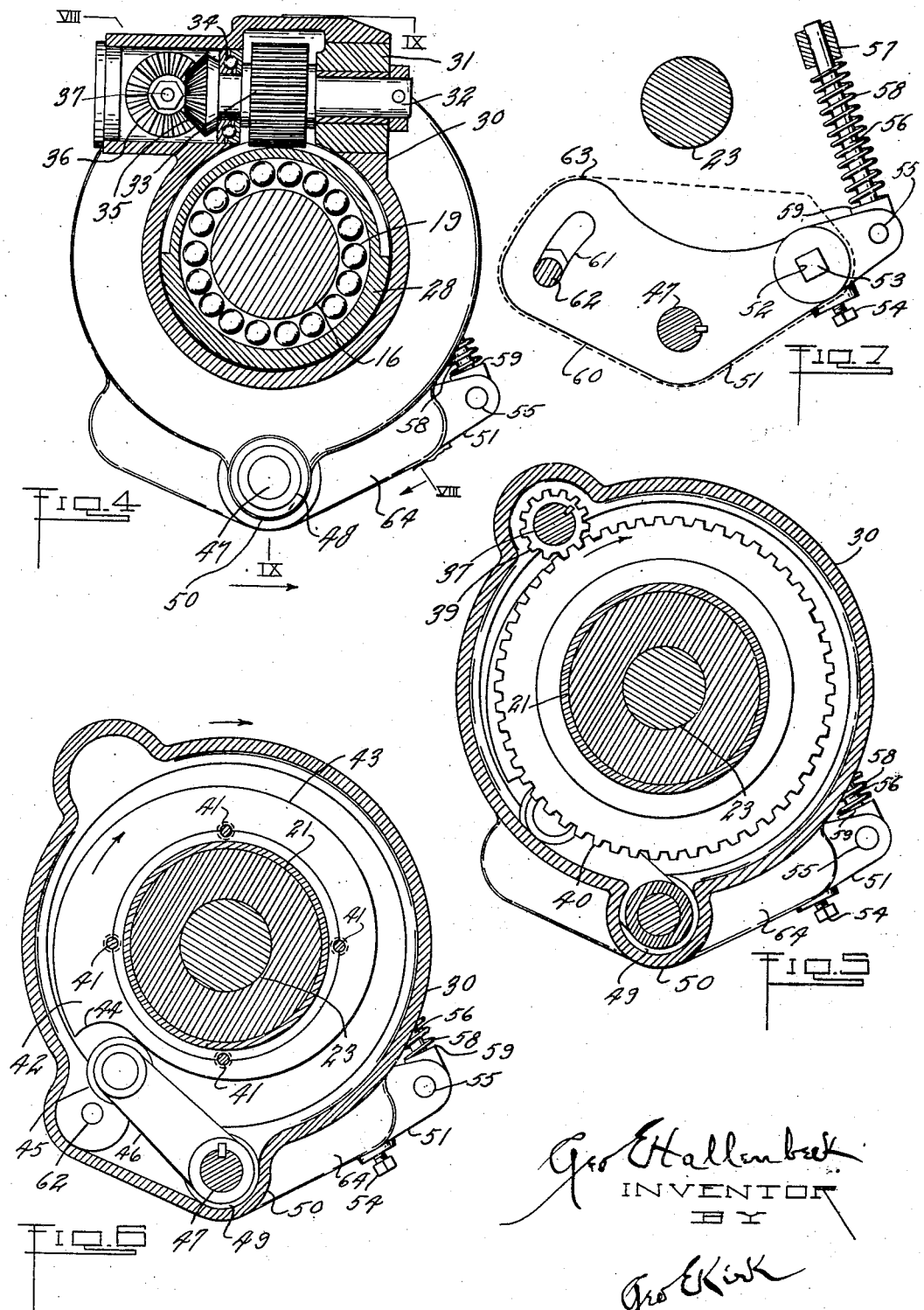

Patented Sept. 29, 1931

1,825,060

UNITED STATES PATENT OFFICE

GEORGE E. HALLENBECK, OF TOLEDO, OHIO, ASSIGNOR TO BAKER BROTHERS, INC., OF TOLEDO, OHIO, A CORPORATION OF OHIO

REVOLVING HOLDER MACHINE TOOL

Application filed May 24, 1926. Serial No. 111,160.

This invention relates to machine tools for facing or dressing a surface.

This invention has utility when embodied in a tool of the drill press or spindle type.

Referring to the drawings:

Fig. 1 shows an embodiment of the invention, with parts broken away, as adapted to a vertical drill press type of machine tool;

Fig. 2 is a perspective view on a small scale of an article of work which may be economically handled in an embodiment as herein disclosed;

Fig. 3 is a view of the revolving holder mechanism or device from the right of Fig 1;

Fig. 4 is a section on the line IV—IV, Fig. 1, looking in the direction of the arrow;

Fig. 5 is a section on the line V—V, Fig. 1, looking in the direction of the arrow;

Fig. 6 is a section on the line VI—VI, Fig. 1, looking in the direction of the arrow;

Fig. 7 is a section on the line VII—VII, Fig. 1, looking in the direction on the arrow;

Fig. 8 is a section on the line VIII—VIII, Fig. 4, looking in the direction of the arrow;

Fig. 9 is a section on the line IX—IX, Fig. 4; and

Fig. 10 is a detail view showing the position of the cutting tool as to the work.

Base 1 is shown as having column 2 carrying adjustable work table 3. On the column 2 is mounted frame overhang 4. Driving pulley 5 on shaft 6 operating through gear wheels 7, 8, 9, as a train, and shaft 10 having bevel gear 11 in mesh with bevel pinion 12 serves to rotate upright shaft 13. This shaft 13 carries pinion 14 in mesh with gear 15 splined on spindle 16 carrying collar 17 sustained by bearing 18. Additional bearing 19 is effective for taking work thrust from the spindle 16 to the overhang 4 of the main frame of this drill press. This bearing 19 is adjacent shoulder 20 of the spindle 16. From this shoulder 20 enlarged diameter portion 21 of the spindle 16 is provided with a seat 22 for guide stem 23 which may be anchored with this enlargement 21 of the drill spindle by key 24. Way 25 through this enlargement 21 permits insertion of a tool for removal of this guide extension 23.

Sleeve 26 about the spindle 16, adjacent the bearing 19, is splined in the frame 4, and has anchored thereto by set screw 27, worm 28 as extending about the spindle 16. By key 29 there is mounted on the enlargement 21 of the drill spindle 16, housing 30 providing bearing 31 (Fig. 4). In this bearing 31 and extending tangentially as to the spindle 16, there is shaft 32 carrying worm wheel 33 in mesh with the worm 28. On the opposite side of this worm wheel 33 from the bearing 31, this shaft 32 has thrust bearing 34 spacing the worm wheel 33 from bevel pinion 35 in mesh with bevel pinion 36 on shaft 37 parallel to the axis of the spindle 16. This shaft 37 is mounted in bearing 38 of the frame 30 and as downwardly extending from the bevel pinion 36 carries pinion 39 in mesh with gear 40 as embracing the enlargement 21 of the spindle 16 and relatively rotatable. Bolts 41 serve to anchor to this gear 40, cam 42 on the side of the gear 40 more remote from the worm 28. This cam 42 has gradual increase in radius portion 43 (Fig. 6) with an abrupt decrease in radius portion 44 between the extremes of the portion 43. There is accordingly, in this disclosure the stationary worm 28 as an actuator effective through the speed reduction during rotation of the spindle 16 to effect a relatively slower speed of rotation of the cam 42.

Coacting with the cam 42 is roller 45 carried by arm 46 fast on shaft 47, as a fulcrum, mounted in bearings 48, 49, (Fig. 9), in housing extension 50 of the frame 30. Fixed with this shaft 47 is arm 51 having seat 52 (Fig. 7) as a holder, mounting cutting tool 53 as held in adjustable position therein by set screw 54. This cutting tool 53 is of the point or single edge cutting type as distinguished from a sweep face type of cutter.

The arm 51 beyond the holder portion has a pivot pin 55 engaging link 56 extending loosely through guide 57 (Figs. 7, 9). Compression helical spring 58 coacts between the guide 57 and shoulder 59 adjacent the pivot pin 55 on the link 56 thereby normally maintaining the arm 51 rocked into radially remote position as to the spindle axis and away from the extension 23. Accordingly, the roller 45 is yieldably held against the cam 42 at all times. The arm 51 has an angular extension 60 therefrom having arc slot 61 therein serving as a guide plate coacting with guide bolt 62 (Figs. 3, 7). This guide bolt 62 is anchored in extension 63 from the revolving housing or frame 30.

The housing 30, opposite the flange 63 as to the shaft 47, carries flange 64 as a rest opposing the holder arm 51. The position of the cutter 53 and the direction of rotation of the spindle 16, herein shown as clockwise as looking down on the work, is such that the tool is pulled into the work instead of pushed into the work by the relative clockwise movement of the cam 42 as effecting larger diameter of cutting action of the tool as the work progresses. The cam is designed as herein to have the radial throw action upon the tool sufficient to face the article of work.

As herein shown the article of work is rear axle housing 65 having region 66 to be machined off or faced. The work 65 is anchored by holder 67 with the work table 3. The tool at the starting of the work is disposed in the region of central opening 68 of the work 65. As the machine tool is operated it progresses radially outward in dressing the face 66 until clear of such face 66. Then the tool 53 reaches the portion 44 of the cam and is automatically reset for a repetition of a like dressing operation on another article of work or repetition on the same article of work. This re-facing may be for a more shallow cut or a stage of cutting. Accordingly, the distance between the travel or revolution plane of the tool 53 and the work may be adjusted as to the position of the spindle 16 and the table 3. This is conveniently accomplished by adjusting the table 3 by means of a crank 69 or adjusting the spindle sleeve 26 by rotating hand wheel 26'. The frame 30 as enveloping the speed transmission reduction for the cam drive, has the lower portion thereof closed by plate 70 mounted with the frame 30 by bolts 71. This plate 70 has central opening 72 through which the extension 23 extends as a stiffening guide and nut 73 about this guide 23 coacts with washer 74 abutting this plate 70 to stiffen this revolving feed and tool carrier mechanism.

This type of holder drive is effective for high speed of rotation with a desired adjustment of progress or radial travel over a range as selected. This type of cutting tool may have a rapid speed with a minimum of tool upkeep as well as a minimum of wear of the machine and low power consumption for the amount of work accomplished. Accordingly, it is an economical production equipment for efficient turning out of superior character of work.

Herein the work is anchored to the table 3 by holder 67, thereby providing a ring portion 66 located coaxial with the spindle 16 extent. In the operation hereunder, the work is thus anchored and the tool rotates with the spindle and is gradually fed across the face 66. This rotation of the tool 59 is due to the tool being anchored with the housing 30 fixed with the spindle 16. There is relative rotation of the tool as to cam 42 as driven from the worm gearing 28, 33, and bevel gearing 36, 37, effecting shifting of cam 42 against which acts roller 45 on arm 46 fixed with shaft 47 thereby shifting the arm 51 carrying the tool 53 in bringing about the dressing of the face 66 in a plane, which plane is perpendicular to the axis of rotation for the carrier for the tool.

What is claimed and it is desired to secure by United States Letters Patent is:—

1. A machine tool comprising a frame, a rotary spindle protruding from said frame, a tool holder, a tool mounted in the holder, an arm mounting the holder, a bearing for the arm parallel to and eccentric of said spindle axis, and means for rocking the arm including a cam about the spindle, and an actuator for shifting the cam angularly as to the spindle.

2. A machine tool comprising a frame, a rotary spindle protruding from said frame, a tool holder, a tool mounted in the holder, an arm mounting the holder, a bearing for the arm parallel to and eccentric to said spindle axis, and means for rocking the arm including a cam about the spindle, mechanism for shifting the cam as to the spindle embodying a stationary element, and gearing carried by the spindle actuated by said element.

3. A revolving holder for a tool, a transverse actuator for the holder embodying an arm mounting the holder, a tool mounted in the holder for rotation with the holder, a bearing for the arm parallel to the axis of revolution of the holder, yieldable means resisting shifting of the holder radially outward, a cam resisting the yieldable means for maintaining eccentricity of the holder, gearing rotatable with the holder for relatively rotating the cam and including a worm wheel, and a stationary worm for actuating the worm wheel.

4. A tool holder attachment for a rotary spindle comprising an adjustable lever, a fulcrum for the lever parallel to the spindle axis, and control means operable from the spindle for varying the radial working position of the lever as to the axis of the spindle during spindle rotation.

5. A tool holder attachment for a rotary spindle comprising an adjustable lever, a fulcrum for the lever parallel to the spindle axis, and control means for positioning the lever for varying eccentricity of the tool by rocking said lever on its axis transversely of the spindle axis.

6. A tool holder attachment for a rotary spindle comprising an adjustable lever, a fulcrum for the lever parallel to the spindle axis, and control means for positioning the lever for varying eccentricity of the tool, said control means including a cam.

In witness whereof I affix my signature.

GEO. E. HALLENBECK.